June 26, 1923.  1,459,718
G. R. BOTT
CAGE FOR ANTIFRICTION BEARINGS
Filed July 24, 1920   2 Sheets-Sheet 1
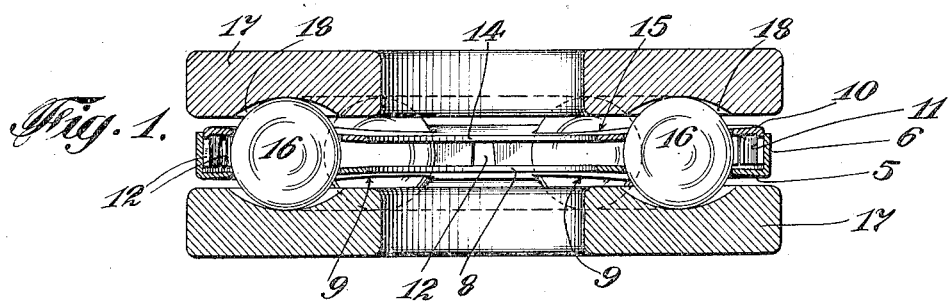
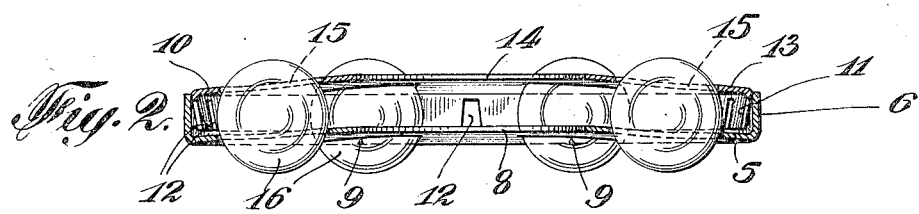
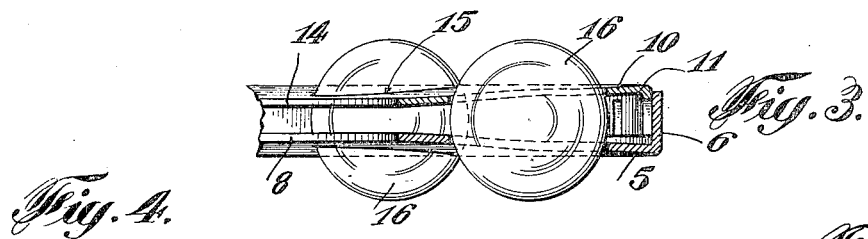
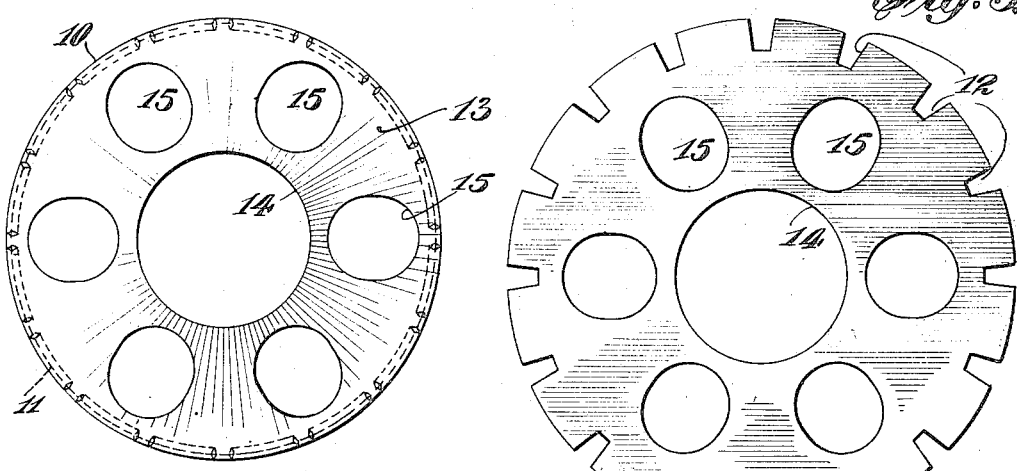
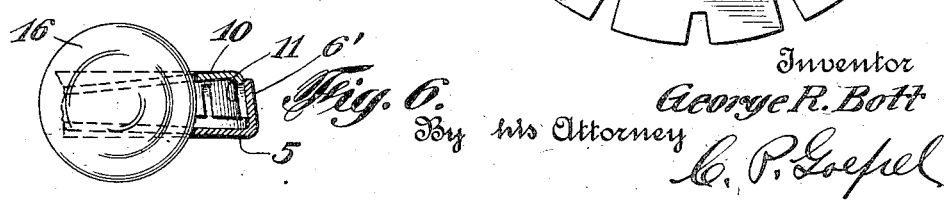
Inventor
George R. Bott
By his Attorney
C. P. Goepel

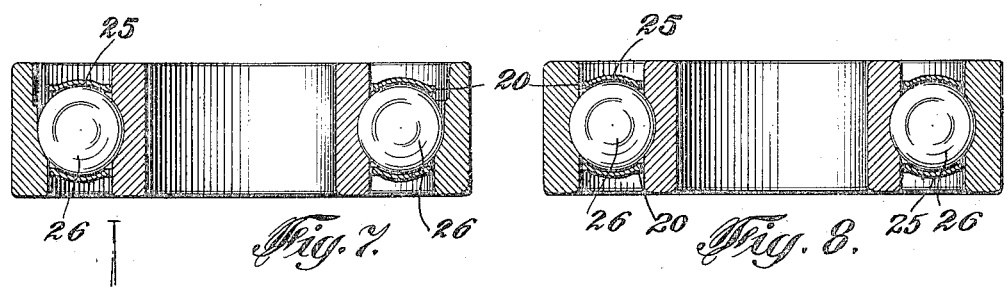
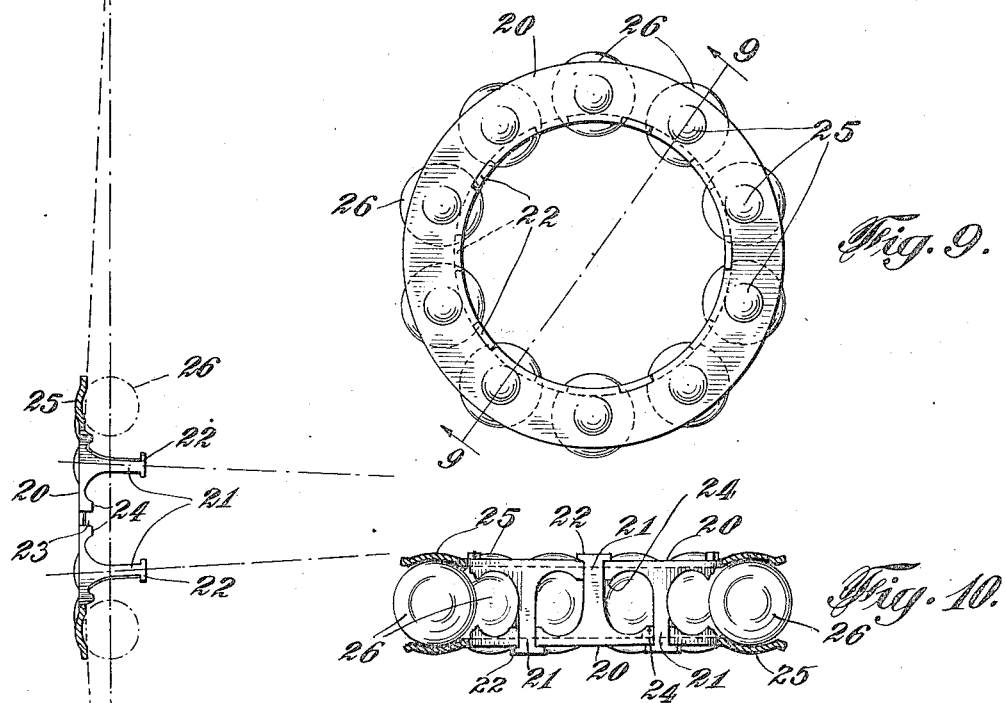
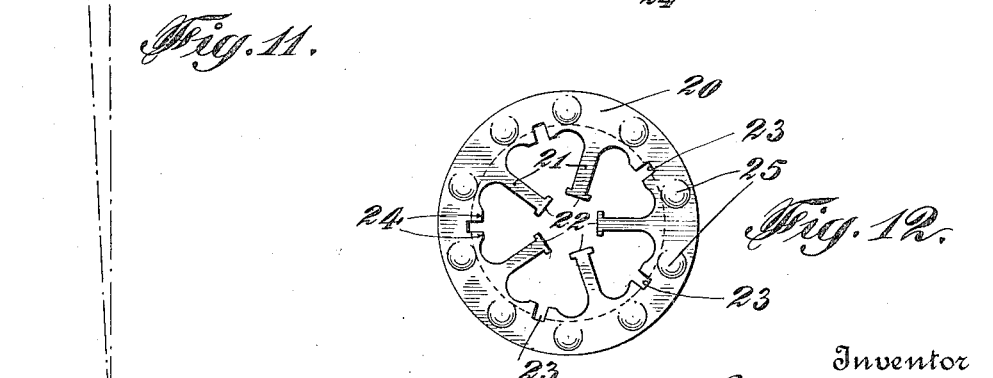

Patented June 26, 1923.

1,459,718

UNITED STATES PATENT OFFICE.

GEORGE R. BOTT, OF NEW ROCHELLE, NEW YORK, ASSIGNOR TO NORMA COMPANY OF AMERICA, OF LONG ISLAND CITY, NEW YORK, A CORPORATION OF NEW YORK.

CAGE FOR ANTIFRICTION BEARINGS.

Application filed July 24, 1920. Serial No. 398,772.

*To all whom it may concern:*

Be it known that I, GEORGE R. BOTT, a citizen of the United States, and resident of New Rochelle, in the county of Westchester and State of New York, have invented certain new and useful Improvements in Cages for Antifriction Bearings, of which the following is a description.

This invention relates to cages for antifriction bearings, and generically considered, comprehends the provision of a cage consisting of separable units of spring metal, wherein the mechanical forces incident to the buckling of the metal plate or sheet, and the inherent resiliency of the metal are utilized for the purpose of rigidly connecting the cage sections to hold the anti-friction bearing elements in assembled relation, and also in order to enable the cage sections to be easily and quickly disconnected and separated when inspection of the parts, or replacement of the bearing elements become necessary.

My invention further contemplates a separable cage structure applicable to either thrust or radial bearings, in which an interlocking frictional connection incident to the distortion or buckling of the cage sections from their normal positions may be most effectively utilized.

More particularly the invention, in one embodiment thereof, contemplates the provision of a cage for thrust bearings consisting of two sections of resilient sheet metal, each provided with means to receive the bearing elements, each cage section likewise having means for frictional coacting engagement, with complementary means on the other cage section to thereby separably lock the cage sections together, and retain the bearing elements in their relative assembled positions between said sections.

In another embodiment of the invention, particularly designed for use in connection with the radial type of bearing, the complementary cage units or sections are provided with alternately arranged fingers and recesses, which are adapted to be brought into interlocking engagement with each other by buckling the resilient metal units inwardly, whereby the unit structure is placed under tension, and the fingers of one unit caused to frictionally interlock in the recesses of the opposed unit.

In general, the present improvement aims to provide a cage for anti-friction bearings of the thrust or radial type, which is very simple and inexpensive in its construction, and wherein the cage units, together with the bearing elements, may be readily assembled without necessitating the use of rivets, screws, or other analogous connecting elements, or the employment of special tools.

With the above and other objects in view, the invention consists in the improved form, construction, and relative arrangement of the several parts, as will be hereinafter more fully described, illustrated in the accompanying drawings, and subsequently incorporated in the subjoined claims.

In the drawings, wherein I have illustrated several practical and satisfactory embodiments of the invention, and in which similar reference characters designate corresponding parts throughout the several views:

Figure 1 is a sectional view through an assembled thrust bearing, having a cage constructed in accordance with one embodiment of my invention.

Figure 2 is a similar view, the race plates being omitted and the cage elements shown in their normal condition before being locked together.

Figure 3 is a fragmentary sectional view similar to Figure 2, and showing the cage sections in locked position with the bearing elements.

Figure 4 is a plan view of the locking section of the cage.

Figure 5 is a plan view of the blank from which said cage section is formed.

Figure 6 is a detail fragmentary section illustrating a slightly modified construction.

Figure 7 is a sectional view of a modified form of the device applied to an open type radial bearing.

Figure 8 is a similar view of the device as applied to a closed type radial bearing.

Figure 9 is a side elevation of the radial type bearing cage.

Figure 10 is a section taken on the line 9—9 of Figure 9.

Figure 11 is a diametrical section through one of the cage sections, illustrating the normal form thereof, and, Figure 12 is a plan view of the stamped metal blank from which the cage unit is formed.

Referring in detail to the drawings, and more particularly to Figures 1 to 5 thereof, 5 designates one section of the cage, which, as herein shown, is constructed of resilient sheet metal and provided with an annular marginal flange 6 extending at right angles to the body wall thereof. This body wall is concaved inwardly, and is provided with a central opening 8 to accommodate the shaft, and an annular series of spaced openings 9, which are slightly elongated radially of the cage section.

The other unit or section 10 of the cage is likewise constructed of resilient sheet metal, and is provided with a marginal flange 11, split at spaced points, as shown at 12. The body wall of this cage section is of slightly conical form, and is normally projected in an opposite direction from the marginal flange 11 with respect to the body wall of the cage section 5, so that when these cage sections are arranged in opposed relation with their flanges extending towards each other, as seen in Figure 2, the body walls thereof will lie in substantially parallel planes. The conically bowed or concaved body wall 13 of the cage section 10 is likewise centrally provided with an opening 14 to accommodate the shaft, and also with the annular series of spaced radially elongated openings 15, which, in conjunction with the opposed openings 9 in the cage section 5, are adapted to receive the bearing elements 16.

In the present disclosure I have illustrated these bearing elements in the form of balls, which project beyond the opposite sides of the assembled cage units, and travel in the races 18 of the plates 17.

In assembling the sections of the cage and the bearing elements, as seen in Figure 1 of the drawings, the balls 16 are first arranged in the openings 9 of the cage section 5. The other cage section 10, in its normal condition, is then arranged with its split marginal flange disposed within the marginal flange 6 of the cage section 5. This arrangement is clearly shown in Figure 2 of the drawings. Pressure in an axial direction is now applied against the outer surface of the wall 13 and around the opening 14 of the cage section 10, and said wall is sprung inwardly to the position seen in Figure 1. Normally the split flange 11 on the cage section 10 at all times tends to maintain a position at an angle of 90° with respect to the plane of the wall 13. Thus, when the wall is buckled inwardly, this flange is sprung outwardly and against the inner face of the marginal flange 6 on the cage section 5, so that a secure frictional gripping engagement is obtained between these flanges. Thus a substantially rigid connection is effected between the two cage units or sections, which will prevent their separation from each other. When the cage sections have thus been assembled, the body walls are of shallow dish-shaped form, so that they present a symmetrical appearance, the said walls being located substantially at equal distances at opposite sides of the common axial center line of the bearing elements 16. It will be understood that the openings 9 and 15 in the cage sections are of such size and shape as to retain said elements in proper spaced relation to each other, and yet permit of their relative free and unretarded rotation.

Should it become necessary to replace one or more of the bearing elements in the cage, or to open the cage for inspection, this may be readily accomplished by simply reversing the operation above described. In other words, by pressing on the under side of the wall 13 of the cage section 10 in an outward direction, said wall may be returned to its original outwardly projecting conical condition, thereby also releasing the outward resilient frictional pressure of the flange 11 against the flange 6 of the cage section 5, and permitting said flange 11 to spring inwardly to its normal position. In this manner the frictional locking action is released, and the cage sections or units may be readily separated from each other without requiring the application of other forces.

In Figure 6 of the drawings, I have shown a slightly modified construction, wherein the annular flange 6' of the cage section 5 is slightly inclined in an inward direction. This will increase the holding action of the split flange 11 of the cage section 10 against the flange 6', and may be employed in cases where additional security and rigidity is desirable. However, as the cage is loosely sustained by the bearing elements between the race plates 17, and no resistance is applied to any part thereof, for all ordinary purposes the construction first referred to will be found entirely satisfactory.

In practice the improved separable cage construction, as above described, is formed entirely from either sheet brass or steel, which is of the proper gauge to insure the requisite flexibility, permitting of the buckling movement of the cage section 10, as above described. The necessary operations in the formation of the cage sections are quite simple, and in Figure 5 I have illustrated the blank from which the section 10 of the cage is formed by a single stamping operation. The other cage section may, of course, be produced from a blank in a similar manner, and if desired, the section 5 may be formed of heavier material and permanently bent or formed into such shape that it will present a symmetrical configuration in conjunction with the other section 10, when said cage sections are assembled, and locked together by the buckling of the latter section. It will likewise be understood that these cage sections may be provided with any desired number of openings to receive the bearing elements, so that the standard number of such bearing elements as employed in the use of thrust bearing cages for different purposes may be utilized.

As shown in Figures 7 to 12 inclusive of the drawings, I have also devised a separable cage structure for use in connection with radial type bearings, and in Figures 7 and 8 of the drawings I have illustrated this embodiment of my invention as applied to the open and closed types respectively of such a bearing.

In this construction the cage units or sections are also of identically the same form and construction, each unit being produced from a resilient sheet metal blank, which is cut or stamped, to provide the annular body portion 20, having a plurality of locking fingers 21 projecting radially from the inner edge of said annular body portion. These fingers are formed with terminal heads 22, and are alternately arranged with respect to the notches or recesses 23, which are formed in the inner edge of the body 20. At the open ends of the recesses 23, and at each side thereof, a projection or shoulder 24 is formed for a purpose which will be hereinafter described.

The annular body 20 of the cage section or unit is further provided at equi-distantly spaced points with the concavo-convex bearing seats 25 for the balls 26, the seats of the respective cage sections engaging the opposite sides of the balls at their axial centers of rotation.

The metal blank cut or stamped in the manner just described is normally of the form shown in Figure 11 of the drawings, wherein it will be noted that the annular body of the cage section is slightly bowed or dished, and the fingers 21 and the recessed inner edge of the annular body 20 are bent at an angle of 90° with respect to the plane of said body. Thus, as indicated by the broken lines in Figure 11, these spaced fingers 21 are normally disposed in lines converging to a common center.

In assembling the two cage units or sections in connection with an open type radial bearing, as seen in Figure 7 of the drawings, the bearing elements or balls 26 are first arranged in proper spaced relation, or in lieu of the balls, blocks or other equivalent means may be substituted against the opposite sides of which the cage sections or units are arranged. Pressure is now brought to bear against the outer sides of the cage sections at the inner edges of their body portions 20 at a plurality of spaced points, so that the seats 25 of the annular portions 20 of the sections contacting with the balls, or their equivalent means, will be moved relative to the balls, which serve as fulcrums until the ring portions of the cage sections are respectively concaved inwardly with respect to their normal planes. This bending or distortion of the body portions of the two cage sections causes an outward expansion of the end portions of the fingers 21, which are engaged over the inner edge of the opposed ring section between the fingers thereon, and find lodgment in the notches or recesses 23 thereof. The heads 22 at the free ends of the fingers 21 engage against the outer face of the cage section or unit at each side of the notch 23 therein. As the plates of the cage sections are warped or bowed slightly beyond a normally true plane, there is no tendency of these plates to resume their original or normal condition, and the terminal heads of the fingers 21 are, at all times, urged outwardly into the recesses 23 of the respective cage sections. After the cage sections have thus been buckled or warped, the balls while held in proper assembled relation, will be perfectly free to rotate independently within the openings of the cage sections.

The application of the sectional cage construction to the closed type of radial bearing requires a slightly different procedure. Thus, after the bearing balls have been assembled in separated relation between the inner and outer race rings, the two cage units with their projecting fingers are inserted at opposite sides of the series of balls, with the fingers projecting between adjacent balls, so that the balls will be separated from each other by the ten fingers, five on each section of the cage in the illustrated embodiment. The curved edges leading to the shoulders 24 and the recesses 23 of each cage section serve as a guiding means, so that when pressure is brought to bear against the inner edges of the cage sections, as above explained, to buckle the body portion of each cage section, and spread the fingers thereof outwardly, the fingers will ride over the shoulders 24, and their proper engagement in the recesses 23 will be thus automatically effected.

In disassembling the cage sections or units, the terminal heads 22 of the fingers 21 are forced radially in an inward direction to thereby disengage the fingers from the recesses 23. Upon such disengagement of the fingers from the recesses, the body portion of the cage section will immediately resume its normal condition, and the cage sections may then be readily separated and removed.

From the foregoing description considered in connection with the accompanying drawings, the construction and manner of assembling and disassembling the several embodiments of the invention, as herein described, will be readily understood. In both constructions it will be seen that I have succeeded in most effectively utilizing the inherent resilient properties of sheet metal by first buckling the metal from its normal form or original condition, whereby the two units or sections of the cage may be interlocked with each other, and securely and rigidly held in assembled relation with the bearing elements to prevent their casual separation. This desirable result is attained by means of a very simple and inexpensive construction, wherein the use of rivets, screws, or other similar connecting devices is entirely eliminated. The interlocking connection may be very easily and quickly effected, or the cage units separated from each other whenever necessary, for the purpose of inspection or repair.

The improved bearing cage in either of the embodiments herein set forth, may, of course, be produced in many different sizes, in accordance with the particular application and use of the bearing, and while I have herein shown and described several satisfactory constructions, it is, nevertheless, to be understood that the improved sectional separable cage is likewise susceptible of embodiment in numerous other alternative forms, and I, therefore, reserve the privilege of adopting all such legitimate changes as may be fairly embodied within the spirit and scope of the invention as claimed.

I claim:

1. A bearing cage comprising separable units having complemental parts adapted to releasably coact with each other, one of said units consisting of a resiliently yieldable structure adapted to be distorted from its normal condition in the act of assembling said units to effect a coacting engagement of said parts and thereby separably retain the units in associated relation with the bearing elements.

2. A bearing cage comprising separable spring metal units, each provided with parts adapted for resilient frictional holding engagement with each other by buckling one of the cage units from its normal condition to thereby retain the cage units, together with the bearing elements, in assembled relation.

3. A bearing cage comprising separable spring metal units, one of said units having spaced relatively yieldable parts movable into resilient coacting holding engagement with the other unit when said first-named unit is buckled from its normal condition to retain the cage units, together with the bearing elements, in assembled relation.

4. A bearing cage comprising separable spring metal units, each having an annular marginal flange, the body wall of one unit being normally of shallow conical form, and projecting to one side of a true horizontal plane, said units adapted for arrangement in opposed relation to each other, and said body wall of the one unit buckled inwardly towards the wall of the opposed unit to the opposite side of a true horizontal plane, whereby the marginal flanges are caused to frictionally coact with each other, and thereby retain or hold the cage units, together with the bearing elements, in assembled relation.

5. A bearing cage comprising separable spring metal units, said units having means adapted to be brought into coacting holding engagement by buckling one of said units from its normal condition, whereby said cage units are held against casual relative movement to retain the bearing elements in assembled relation with the cage.

6. A bearing cage comprising separable spring metal units, each having a body wall, and an annular marginal flange, the body walls of said units being provided with openings to receive the bearing elements, and said units adapted for arrangement in opposed relation to each other, with the flange of one unit extending within the flange of the other unit, and the body wall of one unit adapted to be buckled from its normal position to cause said marginal flanges to frictionally coact with each other and retain or hold the cage units, together with the bearing elements, in assembled relation.

7. A bearing cage comprising separable spring metal units, each having a dished body wall provided with an annular marginal flange, the body walls of said units being provided with openings to receive the bearing elements, and adapted for arrangement therewith, with said walls in substantially parallel relation, and the flange of one unit extending within the flange of the other unit, the body wall of the first-named unit adapted to be buckled inwardly towards the other unit to the opposite side of a true horizontal plane, whereby the flanges on said units are resiliently held in frictional coacting holding engagement with each other to retain the cage units, together with the bearing elements, in assembled relation.

8. A bearing cage comprising separable spring metal units each having a shallow conical body wall provided with retaining means for the bearing elements, and a plurality of spaced locking fingers normally projecting from said wall in convergent relation to each other, said cage units adapted for arrangement upon opposite sides of a series of bearing elements, and the body walls of said units buckled from their normal positions inwardly beyond medial planes paralleling the common plane of rotation of the bearing elements to thereby cause the locking fingers of each unit to coact with means on the opposed unit and lock said units in assembled relation.

9. A bearing cage comprising separable spring metal units each having an annular body wall normally of shallow conical form, and provided upon its inner edge with spaced fingers extending in convergent relation to each other, and recesses alternately arranged with respect to said fingers, said units adapted for arrangement on opposite sides of a series of bearing elements and the body walls of said unit having means to retain the bearing elements in spaced relation to each other, said body walls adapted to be buckled inwardly beyond medial planes paralleling the common plane of rotation of the bearing elements to thereby cause the fingers of each unit to interlockingly engage with the recesses on the opposed unit and lock said units in assembled relation.

In testimony that I claim the foregoing as my invention, I have signed my name hereunder.

GEORGE R. BOTT.